United States Patent
Kawakami (10) Patent No.: US 9,707,803 B2
(45) Date of Patent: Jul. 18, 2017

(54) PNEUMATIC TIRE

(71) Applicant: TOYO TIRE & RUBBER CO., LTD., Osaka-shi, Osaka (JP)

(72) Inventor: Kazuki Kawakami, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 260 days.

(21) Appl. No.: 14/368,586

(22) PCT Filed: Dec. 6, 2012

(86) PCT No.: PCT/JP2012/081696
§ 371 (c)(1),
(2) Date: Jun. 25, 2014

(87) PCT Pub. No.: WO2013/121659
PCT Pub. Date: Aug. 22, 2013

(65) Prior Publication Data
US 2014/0373990 A1  Dec. 25, 2014

(30) Foreign Application Priority Data

Feb. 15, 2012 (JP) .................................. 2012-030726
Sep. 25, 2012 (JP) .................................. 2012-211066

(51) Int. Cl.
*B60C 19/08* (2006.01)
*B60C 11/00* (2006.01)
*B60C 1/00* (2006.01)

(52) U.S. Cl.
CPC ........ *B60C 11/0041* (2013.01); *B60C 1/0016* (2013.04); *B60C 11/0058* (2013.04);
(Continued)

(58) Field of Classification Search
CPC  B60C 19/082; B60C 11/0041; B60C 11/0066
See application file for complete search history.

(56) References Cited

U.S. PATENT DOCUMENTS

| 4,429,728 A * | 2/1984 | Ippen ..................... B60C 11/00 |
| | | 152/209.18 |
| 6,269,854 B1 * | 8/2001 | Matsuo ................... B60C 11/18 |
| | | 152/152.1 |

(Continued)

FOREIGN PATENT DOCUMENTS

| DE | 69717958 T2 | 4/2003 |
| DE | 102008021593 A1 | 7/2009 |

(Continued)

OTHER PUBLICATIONS

Machine translation for Japan 11-227415 (no date).*

(Continued)

*Primary Examiner* — Steven D Maki
(74) *Attorney, Agent, or Firm* — Westerman, Hattori, Daniels & Adrian, LLP (57) ABSTRACT

Tread rubber forms a ground contact surface. When the ground contact surface is divided into two parts: a mounting inner side and a mounting outer side, the tread rubber has an inner cap part that forms an inner ground contact surface and is produced from non-conductive rubber, and an outer cap part that forms an outer ground contact surface. The inner cap part has a branched conductive part that is formed from conductive rubber ranging from the ground contact surface of a mounting outer end of the inner cap part to the side surface or bottom surface of a mounting inner end while branching off at a plurality of positions. The outer cap part does not have branched conductive rubber. The branched conductive part is formed from the conductive rubber with a rubber hardness different from that of the non-conductive rubber that forms the inner cap part.

3 Claims, 4 Drawing Sheets

(52) U.S. Cl.
 CPC ........ *B60C 11/0066* (2013.04); *B60C 19/082* (2013.04); *B60C 2011/0016* (2013.04)

(56) References Cited

U.S. PATENT DOCUMENTS

| | | | |
|---|---|---|---|
| 2002/0033212 A1* | 3/2002 | Caretta | B60C 11/18 152/209.5 |
| 2002/0185210 A1 | 12/2002 | Poulbot | |
| 2009/0173419 A1* | 7/2009 | Kawakami | B29D 30/60 152/152.1 |
| 2010/0006194 A1* | 1/2010 | Asayama | B29D 30/60 152/152.1 |
| 2011/0303332 A1 | 12/2011 | Kawakami | |

FOREIGN PATENT DOCUMENTS

| | | | |
|---|---|---|---|
| EP | 864446 A1 * | 9/1998 | |
| JP | 10-76810 A | 3/1998 | |
| JP | 10-81783 A | 3/1998 | |
| JP | 11-34611 A | 2/1999 | |
| JP | 11-227415 A | * | 8/1999 |
| JP | 11-227415 A | 8/1999 | |
| JP | 2001-18302 A | 1/2001 | |
| JP | 2003-326917 A | 11/2003 | |
| JP | 2004-507397 A | 3/2004 | |
| JP | 2009-161070 A | 7/2009 | |
| JP | 4611451 B1 | 1/2011 | |
| JP | 4783479 B1 | 9/2011 | |

OTHER PUBLICATIONS

International Search Report dated Mar. 5, 2013, issued in corresponding application No. PCT/JP2012/081696.
Notification of transmittal of Translation of the International Preliminary Report on Patentabilit (form PCT/IB/338), dated Aug. 28, 2014 with forms PCT/IB/373 and PCT/ISA/237 (5 pages).
Office Action dated Nov. 4, 2016, issued in German Patent Application No. 112012005896.8 with English machine translation (14 pages).

* cited by examiner

PNEUMATIC TIRE

TECHNICAL FIELD

The present invention relates to a pneumatic tire in which a steering stability on a dry road surface or a wet road surface is made proper.

BACKGROUND ART

Conventionally, in the pneumatic tire, for various purposes such as securement of a steering stability, a ride quality and a braking performance, there can be listed up a structure in which a tread rubber forming a ground surface is asymmetrically mixed so that a composition is different between a mounting inner side and a mounting outer side of the tire.

For example, in Patent Document 1, there is disclosed a matter that a steering stability is improved by arranging a high-hardness rubber in a mounting outer side area of a cap rubber (a tread rubber) forming a ground surface, and arranging a low-hardness rubber in a mounting inner side of the cap rubber.

PRIOR ART DOCUMENTS

Patent Documents

Patent Document 1: Japanese Unexamined Patent Publication No. JP-A-2003-326917

SUMMARY OF THE INVENTION

Problems to be Solved by the Invention

In the pneumatic tire in recent years, since the pneumatic tire is normally attached to a vehicle body with a camber, the ground contact area is larger in the mounting inner side area than in the mounting outer side area among the ground surface formed by the tread rubber, so that the ground surface in the mounting inner side is dominant for defining the steering stability. Generally, in the case that a modulus (a hardness) of the ground surface in the mounting inner side becomes higher, a pressure per unit area becomes higher by a decrease of the ground contact area. Therefore, the steering stability on the dry road surface is improved. On the other hand, in the case that the modulus (the hardness) of the ground surface in the mounting inner side becomes lower, the steering stability on the wet road surface is improved by an increase of the ground contact area.

According to this, in the case of the tread rubber which is asymmetrically mixed, the steering stability can be improved on any one of the dry road surface and the wet road surface in accordance with the arrangement. However, since these performances are in a conflicting relationship (which may be called as a fighting relationship), it is hard to obtain a desired steering stability only by setting the hardness of the tread rubber. In other words, it is hard to improve the steering stability on any one of the dry road surface and the wet road surface in a state in which the steering stability on the other is maintained, or dramatically improve the steering stability on one of the dry road surface and the wet road surface in place of somewhat sacrifice of the steering stability on the other.

Further, in recent years, for the purpose of reducing the rolling resistance of the tire which is deeply involved with fuel economy performance, there has been proposed a pneumatic tire in which a rubber member such as a tread rubber is formed by a non-conductive rubber which is mixed with a silica at a high rate. However, since the rubber member mentioned above has a higher electric resistance in comparison with the conventional product which is mixed with a carbon black at a high rate, and inhibits static electricity generated in the vehicle body and the tire from being discharged to the road surface, the rubber member has a problem that a defect such as a radio noise tends to be generated. Accordingly, it is necessary to appropriately secure a conductive route for discharging the static electricity.

The present invention is made by taking the problem mentioned above into consideration, and an object of the present invention is to provide a pneumatic tire which improves a setting flexibility of a steering stability on a dry road surface and a steering stability on a wet road surface while securing a conductive route and suppressing deterioration of a rolling resistance.

Means for Solving the Problems

The present invention employs the following means for achieving the object. In other words, according to the present invention, there is provided a pneumatic tire including a tread rubber which forms a ground surface, wherein the tread rubber has an inner tread rubber which is constructed by a non-conductive rubber forming an inner ground surface in the case that the ground surface is sectioned into two sides of a mounting inner side and a mounting outer side, and an outer tread rubber which forms an outer ground surface, wherein the inner tread rubber has a branched conductive part which reaches a side surface or a bottom surface of a mounting inner end part from the ground surface of a mounting outer end part of the inner tread rubber while being branched at a plurality of positions and is formed by a conductive rubber, and the outer tread rubber does not have any branched conductive rubber, and wherein the branched conductive part is formed by a conductive rubber which has a different rubber hardness from that of the non-conductive rubber forming the inner tread rubber.

For example, in the case of arranging the conductive rubber having the higher hardness than the hardness of the inner tread rubber from the ground surface of the mounting outer end part of the inner tread rubber to the side surface or the bottom surface of the mounting inner end part while being branched at a plurality of positions, a rigidity of the tire mounting inner side is enhanced in comparison with the case that the conductive rubber is not arranged, and a pressure per unit area becomes higher by a decrease of the ground contact area, so that a steering stability on a dry road surface is improved. On the other hand, in the case of arranging the conductive rubber having the lower hardness than the hardness of the inner tread rubber in the inner tread rubber in the branched manner, the rigidity of the tire mounting inner side becomes lower in comparison with the case that the conductive rubber is not arranged, and the steering stability on a wet road surface is improved. The present invention utilizes this, and only by arranging the branched conductive rubber having the different hardness from the hardness of the inner tread rubber in the inner tread rubber, the rigidity of the tread can be changed to be set to a desired rigidity in comparison with the case that the branched conductive rubber is not provided. As a result, it is possible to improve the setting flexibility of the steering stability on the dry road surface and the steering stability on the wet road surface, which is hard to be obtained only by setting the hardness of the tread rubber.

All the same time, since the outer tread rubber does not have any branched conductive rubber, it is possible to suppress the arrangement of the conductive rubber in the outer tread rubber corresponding to the position which less contributes to the steering stability on the dry road surface and the steering stability on the wet road surface, thereby suppressing the deterioration of the rolling resistance due to the volume increase of the conductive rubber. Further, the conductive route can be appropriately secured by the branched conductive rubber which is arranged in the inner tread rubber.

In order to more improve the setting flexibility of the steering stability, it is preferable that the branched conductive part at least partly has a mesh position which is formed into a mesh shape in a tire meridian cross section. According to the structure, it is possible to more significantly achieve an effect of changing the rigidity in comparison with the case that the branched conductive part does not have any mesh position, and it is possible to more improve the setting flexibility of the steering stability.

In order to suppress an uneven wear, the branched conductive part is desirably formed by a conductive rubber which passes through an inner side in a diametrical direction than the ground surface while avoiding the position covering the ground surface. According to the structure mentioned above, since it is possible to inhibit the conductive rubber which tends to wear in comparison with the non-conductive rubber, from being exposed as a ground surface to a front surface, it is possible to suppress the uneven wear.

In order to pursue the steering stability on the dry road surface, it is effective that the rubber hardness of the inner tread rubber is set to be higher than the rubber hardness of the outer tread rubber, and the rubber hardness of the branched conductive part is set to be higher than the rubber hardness of the inner tread rubber. According to the structure mentioned above, it is possible to improve the steering stability on the dry road surface by a hardness difference between the branched conductive part and the inner tread rubber as well as a hardness difference between the inner tread rubber and the outer tread rubber, and it is possible to pursue the steering stability on the dry road surface.

In order to pursue the steering stability on the wet road surface, it is effective that the rubber hardness of the inner tread rubber is set to be lower than the rubber hardness of the outer tread rubber and the rubber hardness of the branched conductive part is set to be lower than the rubber hardness of the inner tread rubber. According to the structure mentioned above, it is possible to improve the steering stability on the wet road surface by the hardness difference between the branched conductive part and the inner tread rubber as well as the hardness difference between the inner tread rubber and the outer tread rubber, and it is possible to pursue the steering stability on the wet road surface.

In order to achieve the steering stability on the dry road surface and the steering stability on the wet road surface at the same time, it is effective that the rubber hardness of the inner tread rubber is set to be lower than the rubber hardness of the outer tread rubber and the rubber hardness of the branched conductive part is set to be higher than the rubber hardness of the inner tread rubber, or the rubber hardness of the inner tread rubber is set to be higher than the rubber hardness of the outer tread rubber and the rubber hardness of the branched conductive part is set to be lower than the rubber hardness of the inner tread rubber. According to the structure mentioned above, since it is possible to improve the steering stability on any one of the dry road surface and the wet road surface on the basis of the hardness difference between the inner tread rubber and the outer tread rubber, and it is possible to improve the steering stability on any other of the dry road surface and the wet road surface on the basis of the hardness difference between the branched conductive part and the inner tread rubber, it is possible to achieve the steering stability on the dry road surface and the steering stability on the wet road surface at the same time.

MODE FOR CARRYING OUT THE INVENTION

A description will be given below of a pneumatic tire according to an embodiment of the present invention with reference to the accompanying drawings.

Figure 1:
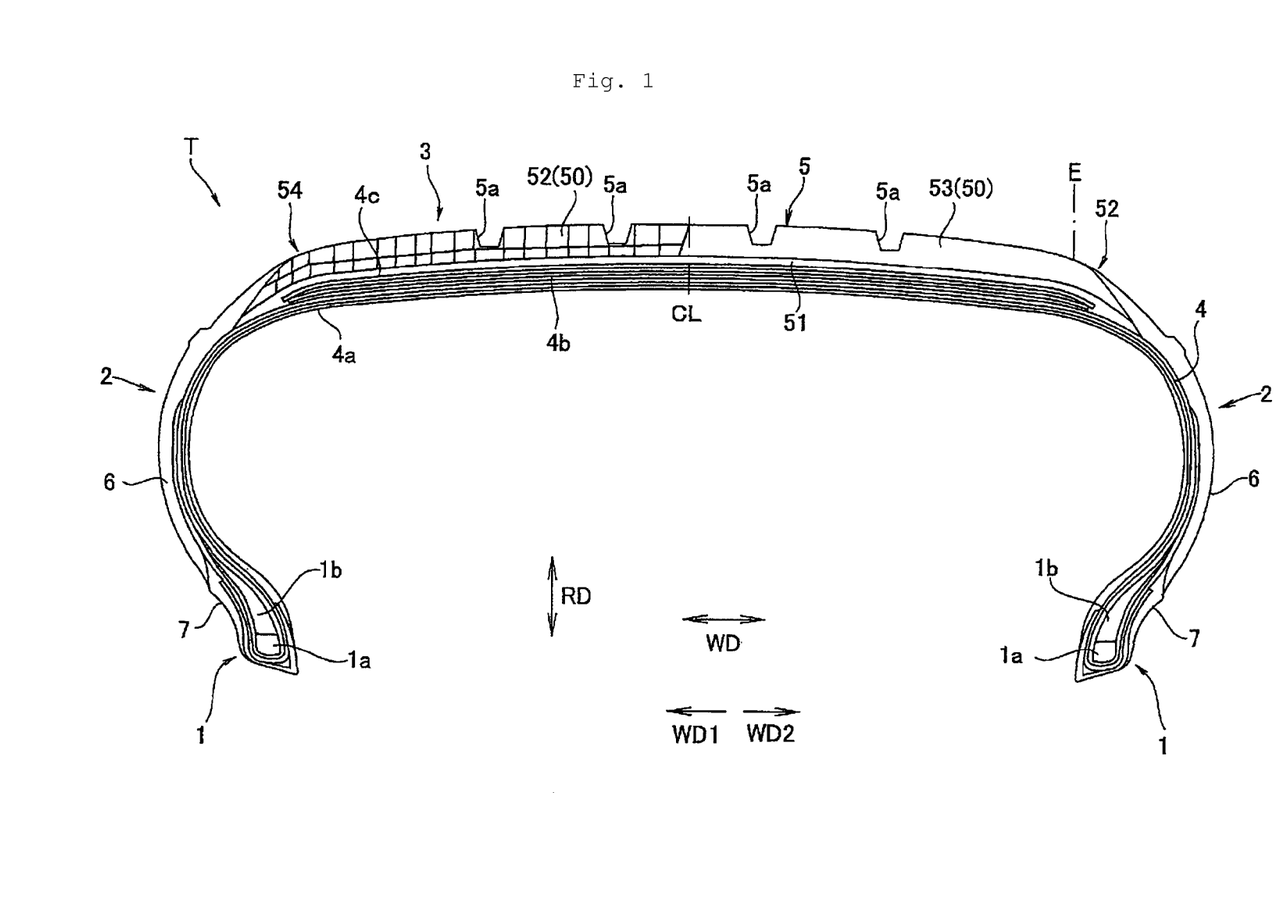
FIG. 1 is a tire meridian cross sectional view showing an example of a pneumatic tire according to the present invention.

As shown in FIG. 1, a pneumatic tire T is provided with a pair of bead portions 1, side wall portions 2 which respectively extend from the bead portions 1 to outer sides in a tire diametrical direction RD, and a tread portion 3 which is connected to outer ends in the tire diametrical direction RD of both the side wall portions 2. In the bead portion 1, there are arranged an annular bead core 1a which is formed by coating a converged body such as a steel wire with a rubber, and a bead filler 1b which is constructed by a hard rubber.

Further, the tire T is provided with a toroidal carcass layer 4 which reaches the bead portions 1 from the tread portion 3 through the side wall portions 2. The carcass layer 4 is provided between a pair of bead portions 1, and is constructed by at least one carcass ply, and end portions thereof are locked in a state in which the end portions are wound up via the bead cores 1a. The carcass ply is formed by coating a cord extending approximately vertically to a tire equator CL with a topping rubber. An inner liner rubber 4a for retaining a pneumatic pressure is arranged in an inner side of the carcass layer 4.

Further, side wall rubbers 6 are provided in outer sides of the carcass layer 4 in the side wall portions 2. Further, rim strip rubbers 7 coming into contact with a rim (not shown) at the installing time of the rim are provided in outer sides of the carcass layer 4 in the bead portions 1. In the present embodiment, the topping rubber of the carcass layer 4, the rim strip rubbers 7 and the side wall rubbers 6 are formed by a conductive rubber.

A belt 4b for reinforcing the carcass layer 4, a belt reinforcing member 4c and a tread rubber 5 are provided in an outer side of the carcass layer 4 in the tread portion 3 one by one from an inner side toward an outer side. The belt 4b is constructed by a plurality of belt plies. The belt reinforcing member 4b is constructed by coating a cord extending in a tire peripheral direction with a topping rubber. The belt reinforcing member 4b may be omitted as occasion demands.

Figure 2:
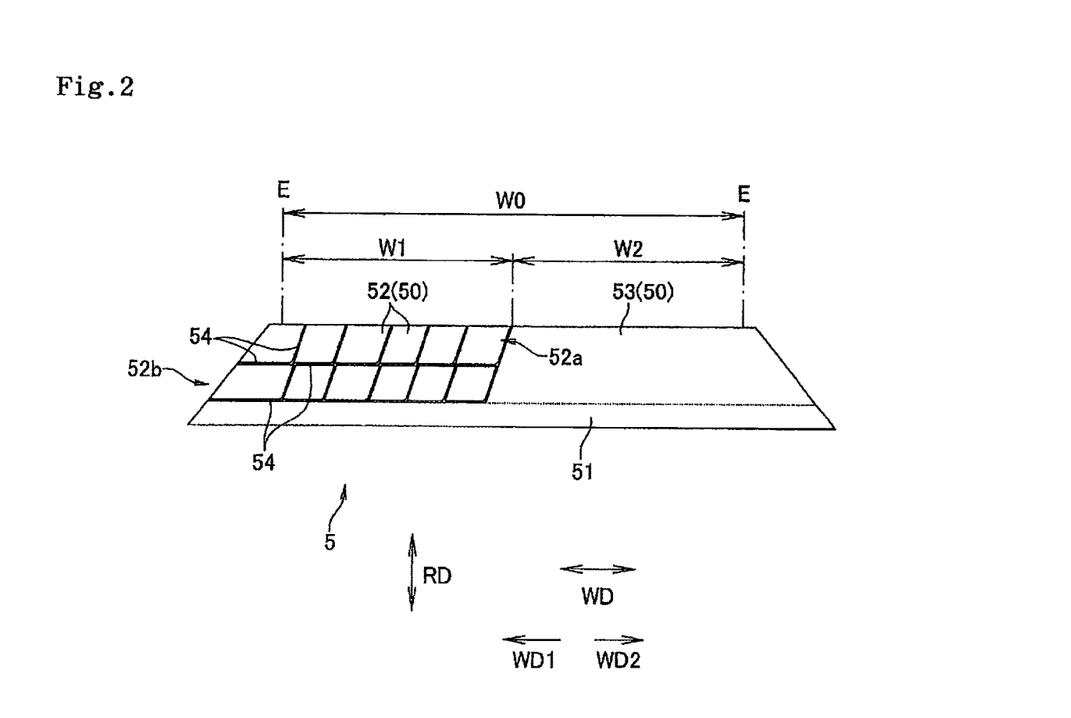
FIG. 2 is a cross sectional view schematically showing a tread rubber before being subjected to vulcanization molding.

FIG. 2 schematically shows the tread rubber 5 before being subjected to vulcanization molding. As shown in FIGS. 1 and 2, the tread rubber 5 has a cap portion 50 which constructs a ground surface, and a base portion 51 which is provided in an inner side in a tire diametrical direction of the cap portion 50. In the above structure, the ground surface is a surface which ground contacts with a road surface in the case that the tire is vertically put on a flat road surface in a state of being assembled in a normal rim and being filled with a normal internal pressure, and a normal load is applied to the tire, and an outermost position in a tire width direction WD becomes a ground contact end E. Here, the normal load and the normal internal pressure are set to a maximum load (a design normal load in the case of a tire for a passenger car) which is defined in JIS D4202 (data of automotive tire) and the corresponding pneumatic tire, and the normal rim is in principle set to a standard rim which is defined in JIS D4202.

The cap portion 50 has an inner cap part 52 which forms an inner ground surface and is made of a non-conductive rubber, and an outer cap part 53 which forms an outer ground surface, in the case that the ground surface is sectioned into two parts of a mounting inner side WD1 and a mounting outer side WD2. The inner cap part 52 corresponds to an inner tread rubber in the present invention, and the outer cap part 53 corresponds to an outer tread rubber in the present invention. The width W1 of the inner ground surface formed by the inner cap part 52 is set to 10 to 90% of the maximum width W0 of the ground surface, and the width W2 of the outer ground surface formed by the outer cap part 53 is set to 90 to 10% of the maximum width W0 of the ground surface in accordance with the setting of the width W1. Preferably, the width W1 of the inner ground surface is desirably set to 30 to 70% of the maximum width W0 of the ground surface.

In the present embodiment, the base portion 51 is formed by the non-conductive rubber having the same composition as that of the outer cap part 53, however, the base portion 51 may be formed by a rubber having the same composition as that of the inner cap part, and may be formed with a composition which is different from both of the inner cap part 52 and the outer cap part 53. The following three patterns can be listed up as a composition pattern of the inner cap part 52 and the outer cap part 53. (1) hardness of inner cap part 52<hardness of outer cap part 53, (2) hardness of inner cap part 52=hardness of outer cap part 53, and (3) hardness of inner cap part 52>hardness of outer cap part 53.

Further, in the present embodiment, the cap portion 50 and the base portion 51 are differentiated, however, the tread rubber 5 can be constructed by two rubbers of the inner tread rubber and the outer tread rubber. A plurality of main grooves 5a extending along the tire peripheral direction are formed on a front surface of the tread rubber 5. In the present embodiment, the base portion 51 is formed by the non-conductive rubber; however, the base portion 51 may be formed by a conductive rubber.

The present embodiment employs a side-on-tread structure in which the side wall rubbers 6 are mounted to both side end portions of the tread rubber 5; however, the present embodiment is not limited to the side-on-tread structure, and can employ a tread-on-side structure in which both side end portions of the tread rubber are mounted to outer ends in the tire diametrical direction of the side wall rubbers.

Here, the conductive rubber is exemplified by a rubber in which a volume resistivity indicates $10^8$ Ω·cm or less, and is manufactured, for example, by mixing a carbon black as a reinforcing agent with a raw rubber at a high rate. The conductive rubber can be obtained by mixing with a carbon group known conductivity application material such as a carbon fiber and a graphite, and a metal group known conductivity application material such as a metal powder, a metal oxide, a metal flake and a metal fiber, in addition to the carbon black.

Further, the non-conductive rubber is exemplified by a rubber in which a volume resistivity indicates $10^8$ Ω·cm or more, and is exemplified by a rubber obtained by mixing a silica as a reinforcing material with a raw rubber at a high rate. The silica is mixed, for example, by 30 to 100 weight part in relation to 100 weight part of the raw rubber component. A wet type silica is preferably employed as the silica; however, the silica which is generally used as the reinforcing material can be used with no limitation. The non-conductive rubber may be manufactured by mixing a baked clay, a hard clay or a calcium carbonate in addition to a silica such as a precipitated silica or a hydrated silica anhydride.

A natural rubber, a styrene butadiene rubber (SBR), a butadiene rubber (BR), an isoprene rubber (IR) and an isobutylene isoprene rubber (IIR) can be listed up as the raw rubber, and they are used respectively independently or used by mixing two or more kinds of these rubbers. The raw rubber is appropriately mixed with a vulcanizing agent, a vulcanization accelerator, a plasticizer or an antioxidant.

The conductive rubber desirably has a composition which satisfies the following conditions in the light of improvement of current-carrying performance by enhancing a durability. Nitrogen adsorption specific surface area: mixing amount (mass %) of $N_2SA$ ($m^2$/g)×carbon black is equal to or more than 1900, preferably equal to or more than 2000, and oil absorption of dibutyl phthalate: mixing amount (mass %) of DBP (ml/100 g)×carbon black is equal to or more than 1500, preferably equal to or more than 1700. $N_2SA$ is determined in conformity to ASTM D3037-89, and DBP is determined in conformity to ASTM D2414-90.

As shown in FIGS. 1 and 2, the branched conductive rubber is not provided in the outer cap part 53 which forms the outer ground surface. On the other hand, the branched conductive part 54 is provided in the inner cap part 52 which forms the inner ground surface, the branched conductive part 54 reaching the side surface of the bottom surface of the mounting inner end part 52b from the ground surface of the mounting outer end part 52a of the inner cap part 52 while branching at a plurality of positions, and being formed by the conductive rubber. The branched conductive part 54 is structured, as shown in FIG. 2, such that mesh positions having a mesh shape in a tire meridian cross section are formed approximately over all the areas of the inner cap part 52, and has a width which is at least larger than a width of the inner ground surface. The formation of the mesh positions means formation of a closed loop by the conductive rubber in the tire meridian cross section. Further, the branched conductive part 54 is formed by the conductive rubber which passes through the inner side in the diametrical direction than the ground surface while avoiding a position covering the ground surface. The conductive rubber constructing the branched conductive part 54 is formed by a conductive rubber having a different hardness from the non-conductive rubber which forms the inner cap part 52. In the case that a hardness difference exists between the inner cap part 52 and the outer cap part 53, the hardness difference between the branched conductive part 54 and the inner cap part 52 may be set to be equal to or more than 1 degree, and more effectively, it is preferable that a hardness difference is equal to or more than 4 degrees. In the case that any hardness difference does not exist between the inner cap part 52 and the outer cap part 53, the hardness difference between the branched conductive part 54 and the inner cap part 52 may be equal to or more than 3 degrees. The rubber hardness here means a hardness which is measured in conformity to a durometer hardness test (type A) of JIS K6253. The higher rubber hardness indicates the harder rubber, and the lower rubber hardness indicates the softer rubber.

The inner cap part 52 is formed according to a so-called ribbon winding construction method. The ribbon winding construction method is a construction method which forms a rubber member having a desired cross sectional shape by spirally winding an unvulcanized ribbon rubber obtained by coating one surface of a non-conductive rubber with a conductive rubber along a tire peripheral direction.

As mentioned above, the pneumatic tire according to the present embodiment is provided with a pair of bead portions 1, the side wall portions 2 which extend to the outer side in the tire diametrical direction RD from the respective bead portions 1 and 1, the tread portion 3 which is connected to the outer ends in the tire diametrical direction RD of the respective side wall portions 2 and 2, the toroidal carcass layer 4 which is provided between a pair of bead portions 1 and 1, and the tread rubber 5 which is provided in the outer side than the carcass layer 4 in the tread portion 3 and forms the ground surface. In the pneumatic tire, the tread rubber 5 has the inner cap part 52 which forms the inner ground surface in the case that the ground surface is sectioned into two parts of the mounting inner side WD1 and the mounting outer side WD2, the inner cap part 52 being made of the non-conductive rubber, and the outer cap 53 which forms the outer ground surface. The inner cap part 52 has the branched conductive part 54 which reaches the side surface or the bottom surface of the mounting inner end part 52b from the ground surface of the mounting outer end part 52a of the inner cap part 52 while branching at a plurality of positions, and is formed by the conductive rubber. On the other hand, the outer cap part 53 does not have a branched conductive rubber. The branched conductive part 54 is formed by the conductive rubber having the different rubber harness from that of the non-conductive rubber which forms the inner cap part 52.

As mentioned above, only by arranging the branched conductive rubber having the different hardness from the hardness of the inner cap part 52 (the inner tread rubber) in the inner cap part 52 (the inner tread rubber), the rigidity of the tread can be changed to be set to a desired rigidity in comparison with the case that the branched conductive rubber is not provided. As a result, it is possible to improve the setting flexibility of the steering stability on the dry road surface and the steering stability on the wet road surface, which is hard to be obtained only by setting the hardness of the tread rubber.

All the same time, since the outer cap part 53 does not have any branched conductive rubber, it is possible to suppress the arrangement of the conductive rubber in the outer cap part 53 (the outer tread rubber) corresponding to the position which less contributes to the steering stability on the dry road surface and the steering stability on the wet road surface, thereby suppressing the deterioration of the rolling resistance due to the volume increase of the conductive rubber. Further, in the structure in which the branched conductive rubber is arranged in all the areas in the width direction of the tread rubber 5 including the outer cap part 53 (the outer tread rubber), the block rigidity is reduced and the steering stability on the dry road surface is deteriorated. However, in the present invention, since the outer cap part 53 does not have any branched conductive rubber, it is possible to prevent the deterioration of the steering stability on the dry road surface due to the reduction of the block rigidity. Further, the conductive route can be appropriately secured by the branched conductive rubber which is arranged in the inner cap part 52 (the inner tread rubber).

Particularly, in the pneumatic tire of the present embodiment, since the branched conductive part 54 at least partly has a mesh position which is formed into a mesh shape in a tire meridian cross section, it is possible to more significantly achieve an effect of changing the rigidity, and it is possible to more improve the setting flexibility of the steering stability.

Further, in the pneumatic tire of the present embodiment, since the branched conductive part 54 is formed by a conductive rubber which passes through an inner side in a diametrical direction than the ground surface while avoiding the position covering the ground surface, since it is possible to inhibit the conductive rubber which tends to wear in comparison with the non-conductive rubber, from being exposed as a ground surface to a front surface, it is possible to suppress the uneven wear.

Figure 3:
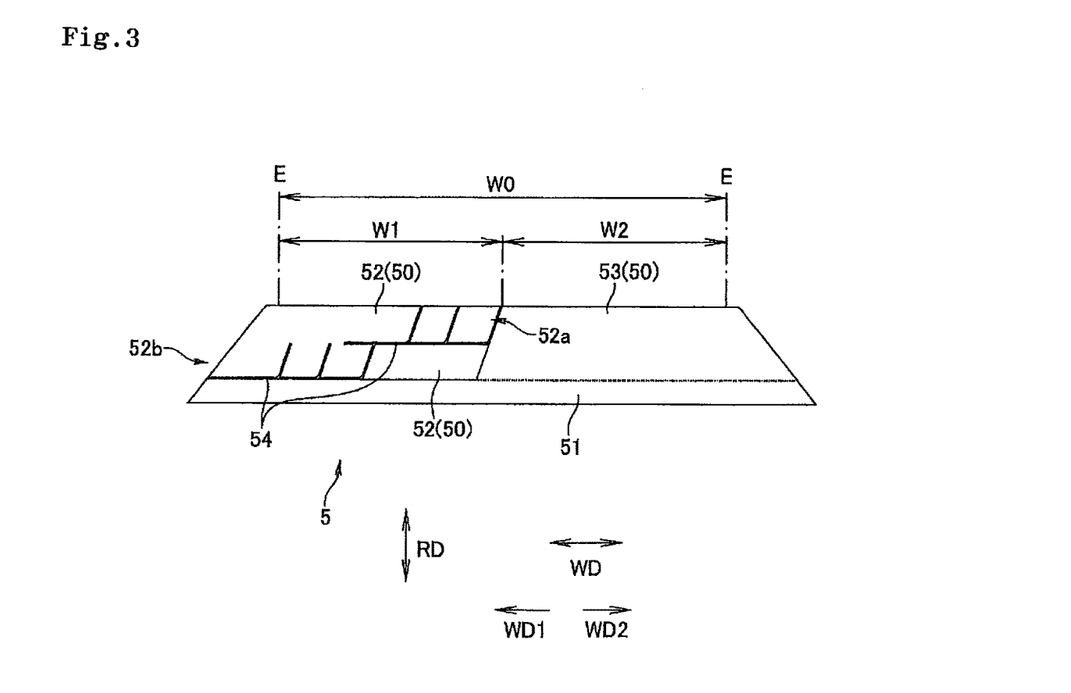
FIG. 3 is a cross sectional view schematically showing a tread rubber before being subjected to vulcanization molding, according to the other embodiment of the present invention.

OTHER EMBODIMENT (1) In the present embodiment, the branched conductive part 54 has the mesh position formed into the mesh shape by branching of the conductive rubber, however, the mesh position may not be formed as long as the conductive rubber reaches the bottom surface or the side surface of the mounting inner end part 52b from the ground surface of the mounting outer end part 52a of the inner cap part 52, for example, as shown in FIG. 3. Provision of no mesh position means formation of no closed loop by the conductive rubber in the tire meridian cross section.

Figure 4:
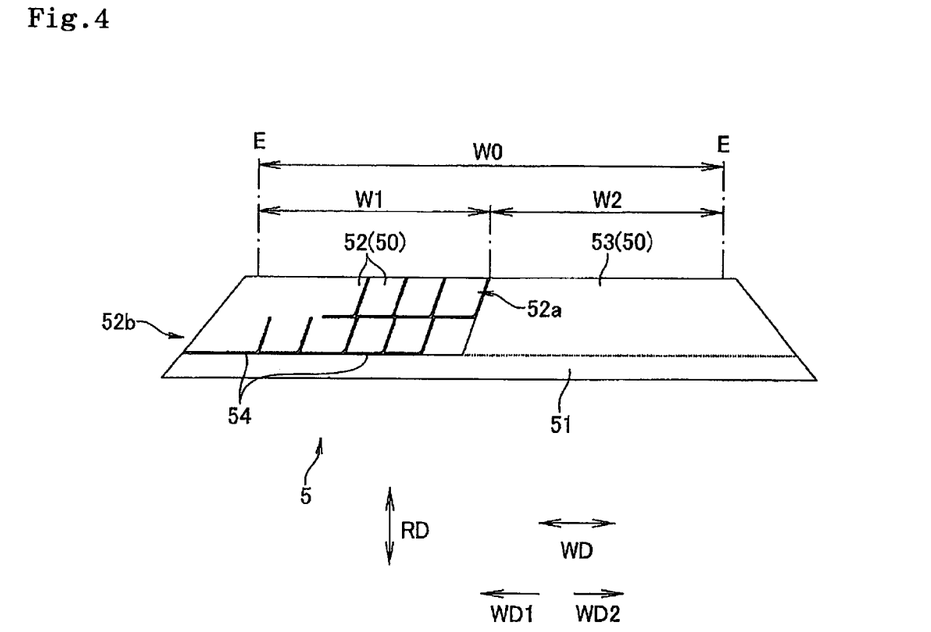
FIG. 4 is a cross sectional view schematically showing a tread rubber before being subjected to vulcanization molding, according to the other embodiment than the above of the present invention.

(2) Further, as shown in FIG. 4, the branched conductive part 54 may be structured such as to have the mesh position only in a part of the inner cap part 52. In this case, it is preferable that at least two closed loops are formed by the conductive rubber in the tire meridian cross section. According to the structure mentioned above, it is possible to effectively change the rigidity of the tread by the mesh position, and it is possible to suppress the volume of the conductive rubber in comparison with the case that all the area is formed by the mesh position, so that it is possible to suppress the deterioration of the rolling resistance.

(3) In the present embodiment, the topping rubber of the carcass layer 4, the rim strip rubber 7 and the side wall rubber 6 are formed by the conductive rubber, however, the topping rubber of the carcass, the rim strip rubber and the side wall rubber may be formed by the non-conductive rubber or may be formed by the conductive rubber as long as the conductive route is constructed between the ground surface of the tread portion and the rim contact position in the rim strip rubber. The combination can be appropriately changed.

Figure 5:
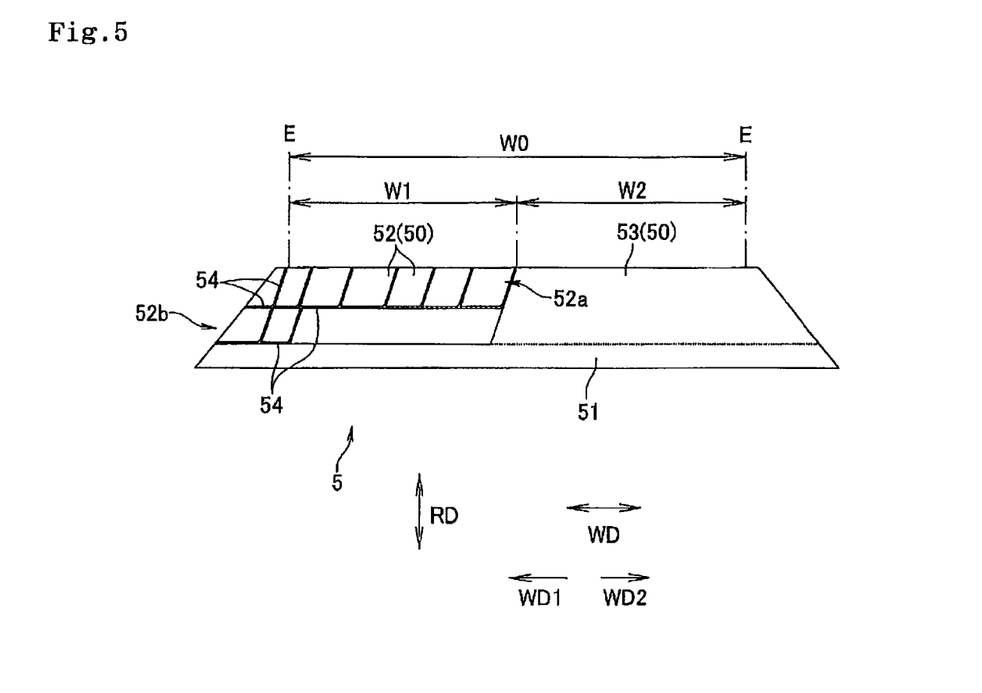
FIG. 5 is a cross sectional view schematically showing a tread rubber before being subjected to vulcanization molding according to the other embodiment than the above of the present invention.

(4) Further, as shown in FIG. 5, it is useful to employ a structure in which the branched conductive part 54 arranged at the mounting outer side WD2 position of the inner cap part 52 is reduced. In other words, as shown in FIG. 5, the branched conductive part 54 forms one closed loop in the mounting inner side WD1 of the inner cap part 52; however, any mesh position constructed by two or more closed loops may not be formed.

Figure 6:
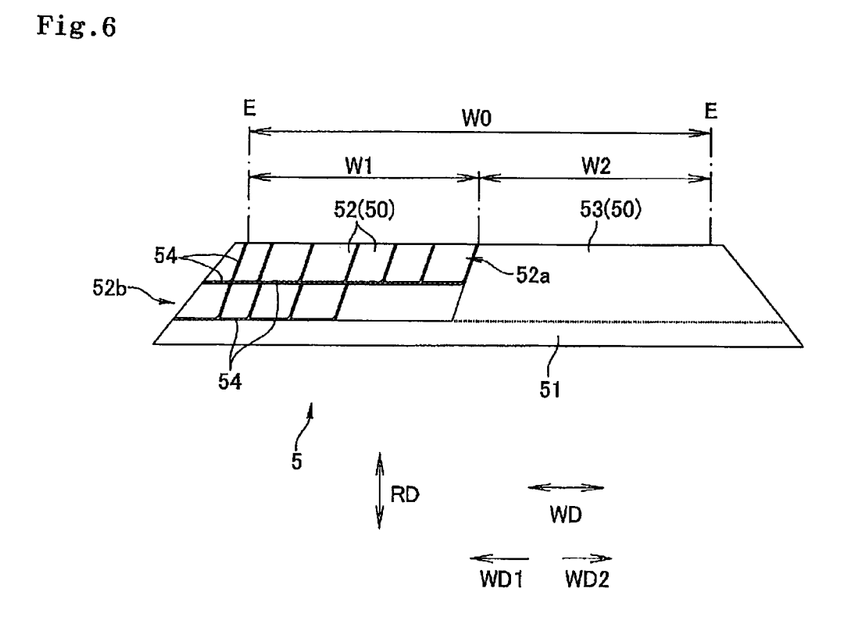
FIG. 6 is a cross sectional view schematically showing a tread rubber before being subjected to vulcanization molding according to the other embodiment than the above of the present invention.

(5) In the same manner, as shown in FIG. 6, it is useful to employ a structure in which the branched conductive part 54 arranged at the mounting outer side WD2 of the inner cap part 52 is reduced. In this case, as shown in FIG. 6, the branched conductive part 54 forms a mesh position constructed by three closed loops in the mounting inner side WD1 of the inner cap part 52; however, the branched conductive part 54 arranged in the mounting outer side WD2 and the inner side in the diametrical direction of the inner cap part 52 is reduced.

EXAMPLE

In order to specifically show the structures and the effects of the present invention, the following evaluations were made about the following examples. Here, the rubber hardness described below is a value obtained by vulcanizing a rubber composition for 30 minutes at 150° C., and measuring a rubber hardness of the vulcanized rubber at 23° C. in conformity to JIS K6253.

(1) Steering Stability

The steering stability was compared by a feeling evaluation based on the dry road surface travel and the wet road surface travel using an actual car. The steering stability was evaluated by an index number while setting the steering stability in a comparative example 1 to 100. The greater the index number is, the higher the steering stability is, and this case is preferable.

Examples 1 and 2

The tire was manufactured by setting the hardness of the inner cap part 52 to 65 degrees, setting the hardness of the outer cap part 53 to 75 degrees, setting the width W1 of the inner ground surface by the inner cap part 52 to 50% of the maximum width W0 of the ground surface, disposing the branched conductive part 54 in the mesh positions in all the area shown in FIG. 2, and forming the base portion 51 by the rubber having the same composition as the outer cap part 53. In an example 1, the hardness of the branched conductive part 54 was set to 60 degrees which is lower than the hardness of the inner cap part 52. In an example 2, the hardness of the branched conductive part 54 was set to 80 degrees which is higher than the hardness of the inner cap part 52.

Examples 3 and 4

In relation to the tires according to the examples 1 and 2, examples 3 and 4 were obtained by respectively setting the hardness of the inner cap part 52 to 75 degrees, and setting the hardness of the outer cap part 53 to 65 degrees. The other factors were set to the same as those of the examples 1 and 2.

Example 5

In relation to the tire according to the example 1, the width W1 of the inner ground surface was set to 70% of the maximum width W0 of the ground surface. The other factors were set to the same as those of the example 1.

Examples 6 and 7

The tire was manufactured by setting both the hardness of the inner cap part 52 and the hardness of the outer cap part 53 to 70 degrees, setting the width W1 of the inner ground surface to 50% of the maximum width W0 of the ground surface, disposing the branched conductive part 54 of the mesh position in all the areas shown in FIG. 2, and forming the base portion 51 by the rubber having the same composition as that of the outer cap part 53. In an example 6, the hardness of the branched conductive part 54 was set to 80 degrees which is higher than the hardness of the inner cap part 52. In an example 7, the hardness of the branched conductive part 54 was set to 60 degrees which is lower than the hardness of the inner cap part 52.

Example 8

In relation to the example 1, the branched conductive part 54 was set to a structure in which the mesh position shown in FIG. 3 is not provided. The other factors were set to the same as those of the example 1.

Example 9

In relation to the tire according to the example 5, the width W1 of the inner ground surface was set to 30% of the maximum width W0 of the ground surface. The other factors were set to the same as those of the example 5.

Example 10

In relation to the example 1, the branched conductive part 54 was structured such that the mesh position (in which two or more closed loops are connected) shown in FIG. 5 is not provided. The other factors were set to the same as those of the example 1.

Comparative Example 1

In relation to the examples 6 and 7, the tire provided with no branched conductive part 54 was manufactured. The other factors were set to the same as those of the examples 6 and 7.

Comparative Example 2

In relation to the examples 1, 2 and 5, the tire provided with no branched conductive part 54 was manufactured. The other factors were set to the same as those of the examples 1, 2 and 5.

Comparative Example 3

In relation to the examples 3 and 4, the tire provided with no branched conductive part 54 was manufactured. The other factors were set to the same as those of the examples 3 and 4.

Comparative Example 4

In relation to the example 1, the width W1 of the inner ground surface was set to 95% of the maximum width W0 of the ground surface. The other factors were set to the same as those of the example 1.

Comparative Example 5

In relation to the example 2, the width W1 of the inner ground surface was set to 75% of the maximum width W0 of the ground surface. The other factors were set to the same as those of the example 2.

Comparative Example 6

In relation to the example 6, the width W1 of the inner ground surface was set to 100% of the maximum width W0 of the ground surface. The other factors were set to the same as those of the example 6.

the case that the branched conductive part 54 is formed by the conductive rubber having the higher rubber hardness than that of the non-conductive rubber forming the inner cap part 52 (the inner tread rubber).

With regard to the steering stability on the wet road surface, the example 1 is improved in comparison with the comparative example 2, the example 3 is improved in comparison with the comparative example 3, and the example 7 is improved in comparison with the comparative example 1. From this matter, the improvement of the steering stability on the wet road surface was confirmed in the case that the branched conductive part 54 is formed by the

TABLE 1

|  | Comparative Example 1 | Comparative Example 2 | Comparative Example 3 | Comparative Example 4 | Comparative Example 5 | Comparative Example 6 | Example 1 | Example 2 |
| --- | --- | --- | --- | --- | --- | --- | --- | --- |
| Structure of conductive part |  |  |  | FIG. 2 (all meshes) | FIG. 2 (all meshes) | FIG. 2 (all meshes) | FIG. 2 (all meshes) | FIG. 2 (all meshes) |
| Rubber harness of mounting inner cap part | 70 | 65 | 75 | 65 | 65 | 70 (all surfaces) | 65 | 65 |
| Rubber hardness of mounting outer cap part | 70 | 75 | 65 | 75 | 75 | 70 (all surfaces) | 75 | 7 |
| Rubber composition of base portion | same as outer side | same as outer side | same as outer side | same as outer side | same as outer side | same as cap | same as outer side | same as outer side |
| Conductive rubber hardness | — | — | — | 60 | 80 | 80 | 60 | 80 |
| Width (%) of inner ground surface in relation to maximum width of ground surface | 50 | 50 | 50 | 95 | 75 | 100 | 50 | 50 |
| Dry steering stability | 100 | 100 | 105 | 90 | 92 | 104 | 98 | 104 |
| Wet steering stability | 100 | 105 | 100 | 105 | 110 | 95 | 109 | 105 |

|  | Example 3 | Example 4 | Example 5 | Example 6 | Example 7 | Example 8 | Example 9 | Example 10 |
| --- | --- | --- | --- | --- | --- | --- | --- | --- |
| Structure of conductive part | FIG. 2 (all meshes) | FIG. 2 (all meshes) | FIG. 2 (all meshes) | FIG. 2 (all meshes) | FIG. 2 (all meshes) | FIG. 3 (no mesh) | FIG. 2 (all meshes) | FIG. 5 (no mesh) |
| Rubber harness of mounting inner cap part | 75 | 75 | 65 | 70 | 70 | 65 | 65 | 65 |
| Rubber hardness of mounting outer cap part | 65 | 65 | 75 | 70 | 70 | 75 | 75 | 75 |
| Rubber composition of base portion | same as outer side | same as outer side | same as outer side | same as cap | same as cap | same as outer side | same as outer side | same as outer side |
| Conductive rubber hardness | 60 | 80 | 60 | 80 | 60 | 60 | 60 | 60 |
| Width (%) of inner ground surface in relation to maximum width of ground surface | 50 | 50 | 70 | 50 | 50 | 50 | 30 | 50 |
| Dry steering stability | 105 | 109 | 95 | 103 | 99 | 100 | 100 | 99 |
| Wet steering stability | 102 | 100 | 112 | 99 | 104 | 107 | 107 | 108 |

From Table 1, the example 2 is improved in comparison with the comparative example 2, the example 4 is improved in comparison with the comparative example 3, and the example 6 is improved in comparison with the comparative example 1, with regard to the steering stability on the dry road surface. From this matter, the improvement of the steering stability on the dry road surface was confirmed in conductive rubber having the lower rubber hardness than that of the non-conductive rubber forming the inner cap part 52 (the inner tread rubber).

Any one performance of the dry road surface and the wet road surface is improved by setting the hardness difference between the inner cap part 52 and the outer cap part 53, and both performances can be freely obtained in comparison with the conventional case further by differentiating the rubber hardness of the branched conductive part 54 from the hardness of the inner cap part 52. For example, the example 1 can be said as a steering stability pursuing type on the wet road surface since the steering stability on the wet road surface is dramatically improved in spite of somewhat sacrifice of the steering stability on the dry road surface. In the same manner, the example 4 can be said as a steering stability pursuing type on the dry road surface. In the examples 2 and 3, the steering stability is improved on both of the dry road surface and the wet road surface, and the examples 2 and 3 can be said as a type achieving both the performances at the same time.

With regard to the width at which the inner cap part 52 (the inner tread rubber) occupies the ground surface, the steering stability on the wet road surface is improved in the example 5 and the example 9 in comparison with the example 1; however, since the degree of improvement is more in the example 5 than in the example 9, it can be known that as the width of the inner cap part 52 is greater, the effect obtained by the branched conductive part 54 is improved. However, it was confirmed that as the width of the inner cap 52 (the inner cap rubber) is greater, the block rigidity is lowered, thereby affecting the steering stability on the dry road surface.

With regard to the shape of the branched conductive part 54, since the steering stability on the wet road surface is improved in the example 8 in comparison with the comparative example 2, the effect was confirmed in spite of no mesh position.

The structures employed in each of the embodiments can be employed in the other optional embodiments. The specific structure of each of the portions is not limited only to the embodiments mentioned above, but can be variously modified within a range which does not deflect from the scope of the present invention.

DESCRIPTION OF REFERENCE SIGNS

5 tread rubber
52 inner cap part (inner tread rubber)
52a mounting outer end part of inner cap part
52b mounting inner end part of inner cap part
53 outer cap part (outer tread rubber)
54 branched conductive part
WD1 mounting inner side
WD2 mounting outer side

The invention claimed is:

1. A pneumatic tire comprising:
   a cap rubber which forms a ground surface, and a base rubber which is provided in an inner side in a tire diametrical direction of the cap rubber,
   wherein the cap rubber has an inner cap rubber which is constructed by a non-conductive rubber forming an inner ground surface in the case that the ground surface is sectioned into two sides of a mounting inner side and a mounting outer side, and an outer cap rubber which is constructed by a non-conductive rubber and forms an outer ground surface,
   wherein the inner cap rubber has a branched conductive part which reaches a side surface or a bottom surface of a mounting inner end part from the ground surface of a mounting outer end part of the inner cap rubber while being branched at a plurality of positions and is formed by a conductive rubber, and the outer cap rubber does not have any branched conductive rubber,
   wherein the branched conductive part is formed by a conductive rubber which has a different rubber hardness from that of the non-conductive rubber forming the inner cap rubber, and
   wherein the rubber hardness of the inner cap rubber is set to be lower than the rubber hardness of the outer cap rubber and the rubber hardness of the branched conductive part is set to be lower than the rubber hardness of the inner cap rubber.

2. The pneumatic tire according to claim 1, wherein the branched conductive part at least partly has a mesh position which is formed into a mesh shape in a tire meridian cross section.

3. The pneumatic tire according to claim 1, wherein the branched conductive part is formed by a conductive rubber which passes through an inner side in a diametrical direction than the ground surface while avoiding the position covering the ground surface.

* * * * *